US008777600B1

(12) United States Patent
Cheng

(10) Patent No.: US 8,777,600 B1
(45) Date of Patent: Jul. 15, 2014

(54) HYDRAULIC CURING SYSTEM

(71) Applicant: Superior Star Engineering Co., Ltd., New Taipei (TW)

(72) Inventor: Yu Cheng, New Taipei (TW)

(73) Assignee: Superior Star Engineering Co., Ltd., New Taipei (TW)

( * ) Notice: Subject to any disclaimer, the term of this patent is extended or adjusted under 35 U.S.C. 154(b) by 0 days.

(21) Appl. No.: 13/927,101

(22) Filed: Jun. 25, 2013

(51) Int. Cl.
*B29D 30/06* (2006.01)
(52) U.S. Cl.
USPC .......................................... 425/34.1
(58) Field of Classification Search
USPC ............................................. 425/28.1, 34.1
See application file for complete search history.

(56) References Cited

U.S. PATENT DOCUMENTS

| 4,804,318 | A | * | 2/1989 | Fujieda et al. | 425/34.1 |
| 4,822,266 | A | * | 4/1989 | Amano et al. | 425/34.1 |
| 5,015,165 | A | * | 5/1991 | Ozaki et al. | 425/34.1 |
| 5,683,726 | A | * | 11/1997 | Mitamura et al. | 425/34.1 |

* cited by examiner

Primary Examiner — James Mackey
(74) Attorney, Agent, or Firm — Leong C. Lei

(57) ABSTRACT

The hydraulic curing system contains a first hydraulic curing device, a second hydraulic curing device, and a number of fastener sets fixedly coupling the first and second hydraulic curing devices side by side together. The first hydraulic curing device has a number of first joint hole sets; whereas the second hydraulic curing device has a number of second joint hole sets. The fastener sets fixedly couple the first and second hydraulic curing devices side by side together by fastening corresponding first and second joint hole sets. Through the present invention, the transportation and assembly of the hydraulic curing system can be conducted by handling the first and second hydraulic curing devices separately. The convenience of the transportation and assembly is as such significantly enhanced.

4 Claims, 4 Drawing Sheets

HYDRAULIC CURING SYSTEM

(a) TECHNICAL FIELD OF THE INVENTION

The present invention is generally related to tire curing devices, and more particular to a hydraulic curing system of enhanced convenience in transportation and assembly.

(b) DESCRIPTION OF THE PRIOR ART

Hydraulic curing is a major process in manufacturing tires. Tires are solidly formed by the high-temperature, high-pressure curing process so that subsequent operations can be conducted.

Existing apparatus for hydraulic curing usually has dual molds or multiple molds for working on multiple tires with a single curing device for increased productivity. As the dimension of tires is increased, the apparatus for hydraulic curing has to be increased in size too.

A manufacturer of the apparatus for hydraulic curing is usually required to ship the apparatus to overseas where the tire manufacturing plant is located.

As the size of the apparatus is increased, the difficulty in transportation and therefore the cost are also increased. For example, the apparatus may not be able to fit in a normal-sized container, may not be lifted by an ordinary crane, etc.

Additionally, when the apparatus arrives at the site, sometimes, some demolishing work to the plant's building has to be done so that the apparatus can be moved inside the plant. Afterwards, the building has to be recovered.

SUMMARY OF THE INVENTION

Therefore, to obviate the shortcomings of prior arts, the present invention provides a novel hydraulic curing system of enhanced convenience in transportation and assembly.

A major gist of the present invention lies in its detachable arrangement to a first and second hydraulic curing devices by applying fastener sets to the corresponding first and second joint hole sets on the first and second hydraulic curing devices, thereby achieving the enhanced convenience in transportation and assembly.

The hydraulic curing system contains a firs hydraulic curing device, a second hydraulic curing device, and a number of fastener sets fixedly coupling the first and second hydraulic curing devices side by side together. The first hydraulic curing device has a number of first joint hole sets; whereas the second hydraulic curing device has a number of second joint hole sets. The fastener sets fixedly couple the first and second hydraulic curing devices side by side together by fastening corresponding first and second joint hole sets.

Through the present invention, the transportation and assembly of the hydraulic curing system can be conducted by handling the first and second hydraulic curing devices separately. The convenience of the transportation and assembly is as such significantly enhanced.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become apparent to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
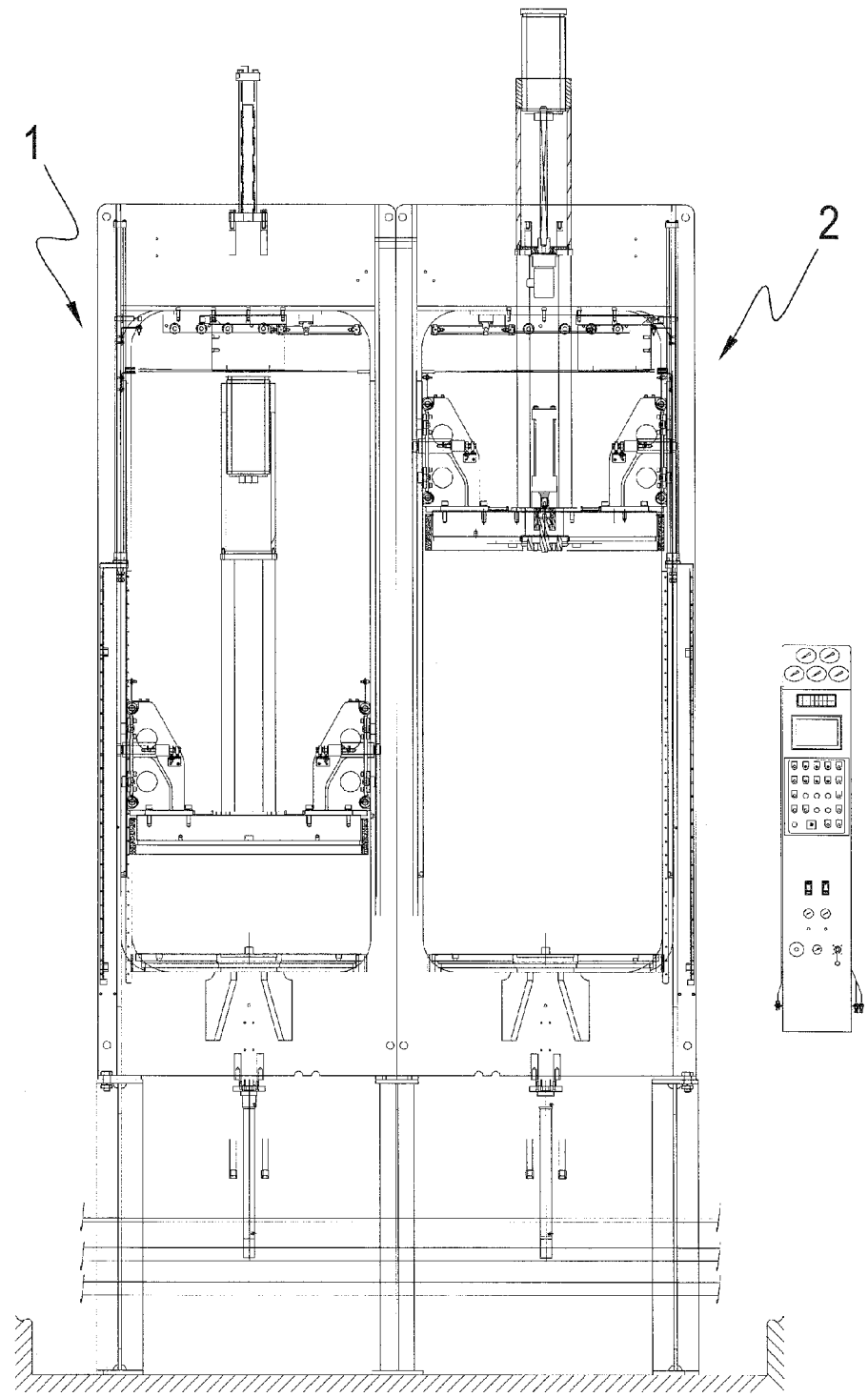
FIG. 1 is a front-view diagram showing a hydraulic curing system according to an embodiment of the present invention.

FIG. 1 is a side-view diagram showing a hydraulic curing system according to an embodiment of the present invention. As shown in FIG. 1, the hydraulic curing system contains a first hydraulic curing device 1 and a second hydraulic curing device 2 side by side fixedly coupled.

Figure 2:
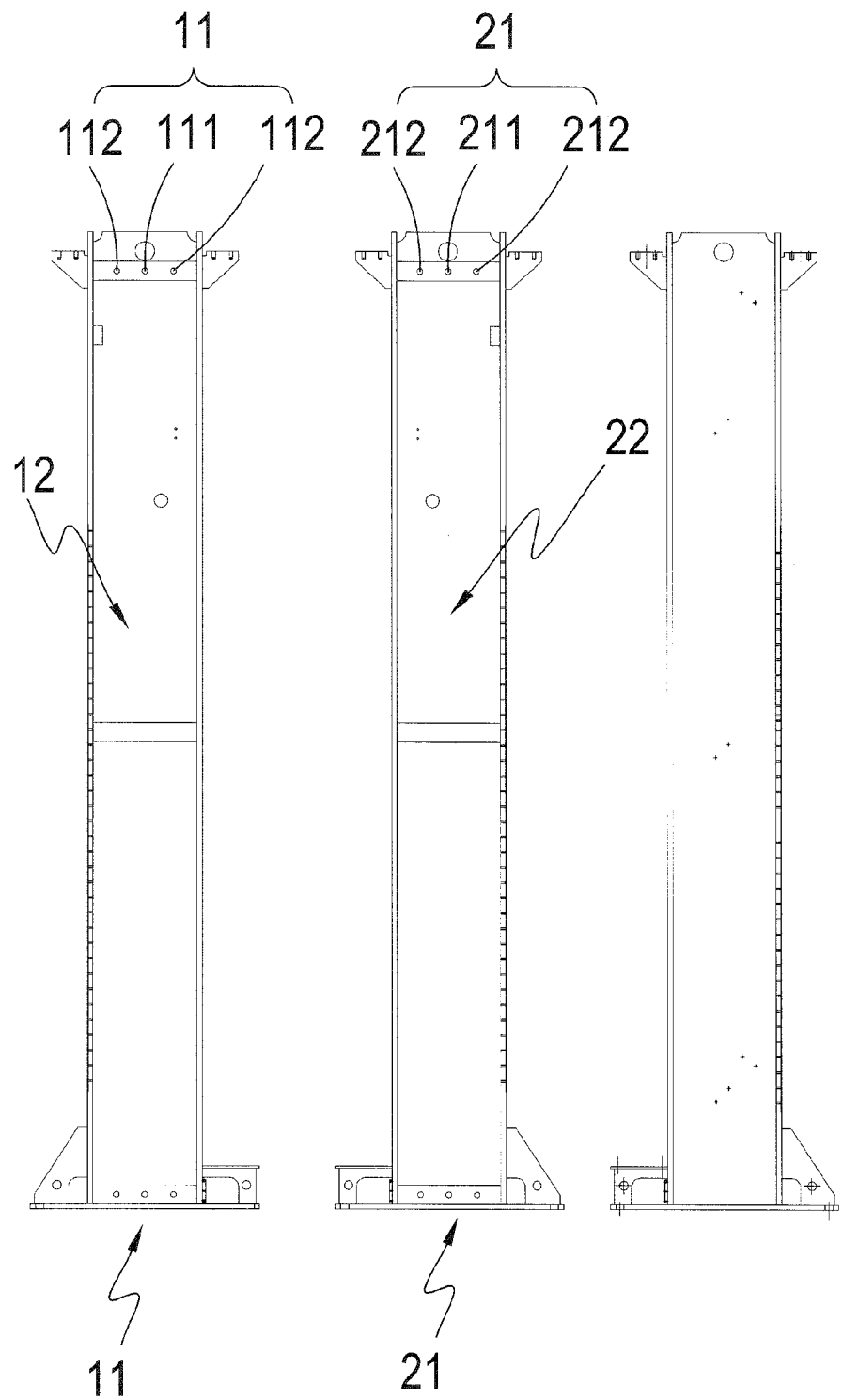
FIG. 2 is a side-view diagram showing the joint faces of a first hydraulic curing device and a second hydraulic curing device of the hydraulic curing system of FIG. 1.

FIG. 2 is a side-view diagram showing the hydraulic curing system. As illustrated in FIG. 2, the first hydraulic curing device 1 has a first joint face 12, and a number of first joint hole sets 11 on the first joint face 12. Each first joint hole set 11 contains at least a first positioning hole 111 and a number of first joint holes 112.

The second hydraulic curing device 2 has a second joint face 22, and a number of second joint hole sets 21 on the second joint face 22. Each second joint hole set 21 contains at least a second positioning hole 211 and a number of second joint holes 212.

Figure 3:
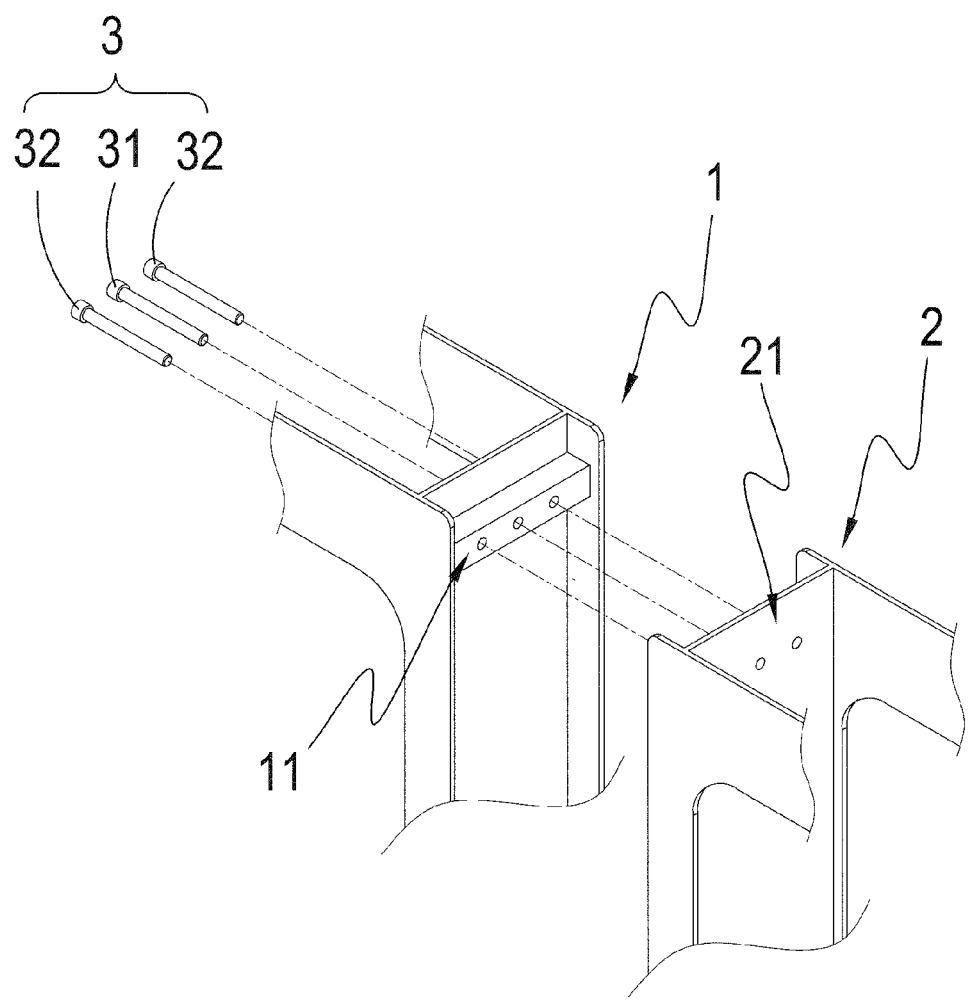
FIG. 3 is a perspective diagram showing the coupling between a first hydraulic curing device and a second hydraulic curing device by a fastener set of the hydraulic curing system of FIG. 1.

The hydraulic curing system further contains a number of fastener sets 3 with which the first and second hydraulic curing devices 1 and 2 are coupled side by side together. FIG. 3 is a perspective diagram showing the coupling between the first hydraulic curing device 1 and the second hydraulic curing device 2 by a fastener set 3. As illustrated, each fastener set 3 contains at least a positioning bolt 31 and a number of joint bolts 32. The positioning bolt 31 runs through the first and second positioning holes 111 and 211, whereas each joint bolt 32 runs through a first joint hole and a second joint hole 112 and 212.

Figure 4:
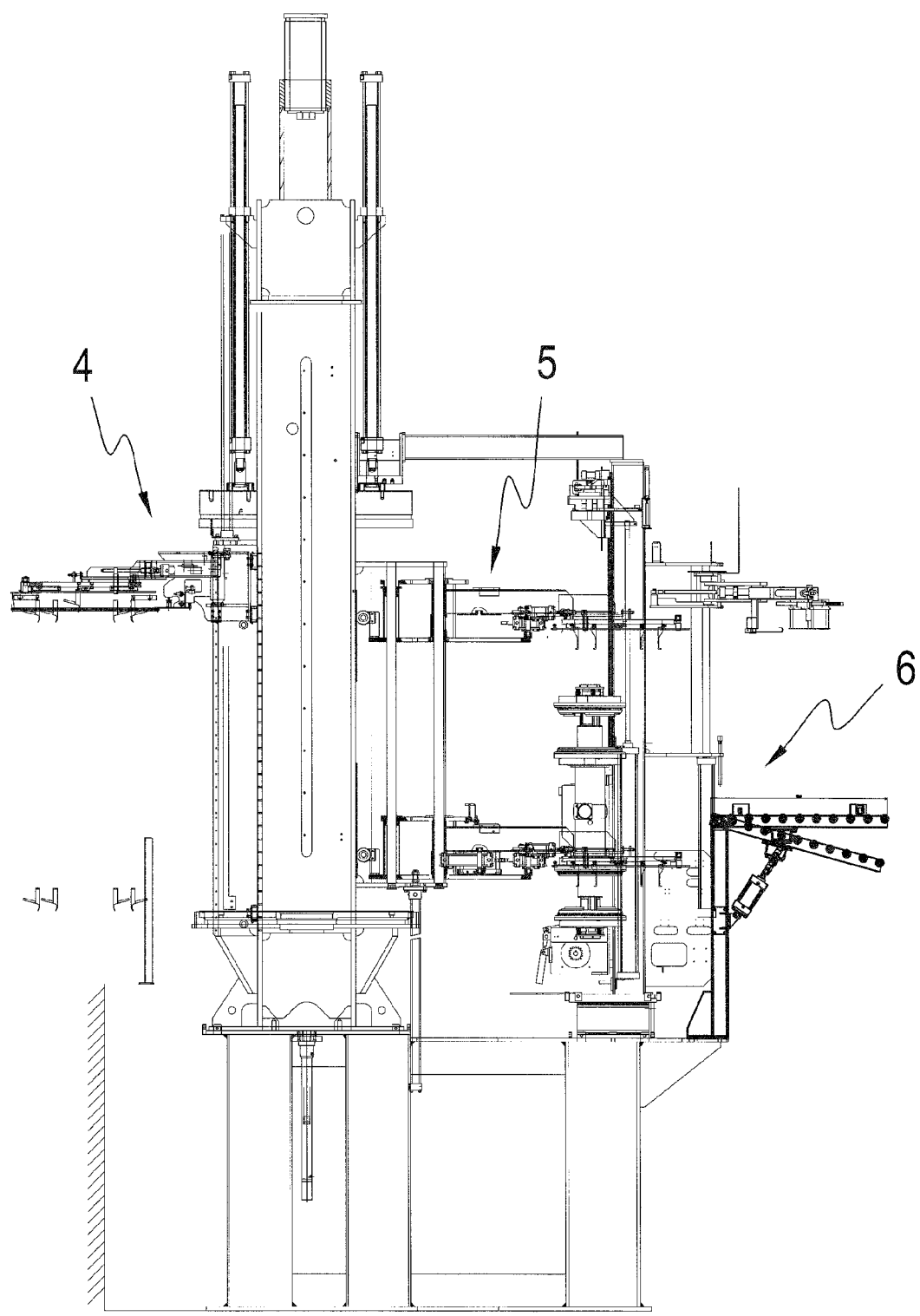
FIG. 4 is a side-view diagram showing the hydraulic curing system of FIG. 1 with additional parts added.

As shown in FIGS. 1 to 3, the first and second hydraulic curing devices 1 and 2 are of an operation style that provides vertical stamping. The first and second hydraulic curing devices 1 and 2 are therefore arranged in an upright manner side by side together with the first and second joint faces 12 and 22 immediately against each other. Then, the positioning bolt 31 is threaded through the first and second positioning holes 111 and 211 so as to align the first and second joint hole sets 11 and 22. Subsequently, each joint bolt 32 is threaded through a first and s second joint holes 112 and 212, and tightly fastened, so that the first and second hydraulic curing devices 1 and 2 are fixedly coupled. Then, as shown in FIG. 4, the other parts that are required for the tire curing, such as a tire loading device 4, a tire offloading device 5, a post-inflation device 6, etc., are assembled onto the hydraulic curing system. Please note that, depending on the actual requirement, not all the aforementioned devices are needed, or additional devices can be added. The present embodiment and FIG. 4 are only exemplary, and are not intended to limit the present invention. To disassemble the hydraulic curing system, the foregoing process is reversed. First, the joint bolts 32, and then the positioning bolt 31 are removed. The first and second hydraulic curing devices 1 and 2 as such can be separated. Therefore, the transportation and assembly of the hydraulic curing system can be conducted by handling the first and second hydraulic curing devices 1 and 2, separately. The convenience of the transportation and assembly is as such significantly enhanced.

The advantage of the hydraulic curing system over prior arts lies in its detachable arrangement to the first and second hydraulic curing devices 1 and 2 by applying fastener sets 3 to the corresponding first and second joint hole sets 11 and 21, thereby achieving the enhanced convenience in transportation and assembly.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A hydraulic curing system, comprising:
   a first hydraulic curing device having a plurality of first joint hole sets;
   a second hydraulic curing device having a plurality of second joint hole sets; and
   a plurality of fastener sets fixedly coupling the first and second hydraulic curing devices side by side together by fastening each first joint hole set to a second joint hole set with a fastener set.

2. The hydraulic curing system according to claim 1, wherein the first hydraulic curing device has a first joint face on which the first joint hole sets are configured; the second hydraulic curing device has a second joint face on which the second joint hole sets are configured; the first and second joint faces are immediately against each other; and the first and second joint hole sets are aligned.

3. The hydraulic curing system according to claim 1, wherein each first joint hole set comprises a first positioning hole and a plurality of first joint holes; and each second joint hole set comprises a second positioning hole and a plurality of second joint holes.

4. The hydraulic curing system according to claim 3, wherein each fastener set comprises a positioning bolt and a plurality of joint bolts; each positioning bolt runs through a first positioning hole and a corresponding second positioning hole; and each joint bolt runs through a first joint hole and a corresponding second joint hole.

* * * * *